(12) United States Patent
Abrams et al.

(10) Patent No.: US 8,566,319 B2
(45) Date of Patent: Oct. 22, 2013

(54) SELECTIVELY ORGANIZING A RECIPIENT LIST BASED ON EXTERNAL GROUP DATA

(75) Inventors: Zachary W. Abrams, Durham, NC (US); Matthew G. Marum, Cary, NC (US); Pamela S. Ross, Raleigh, NC (US); Steven K. Speicher, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/981,620

(22) Filed: Dec. 30, 2010

(65) Prior Publication Data

US 2012/0173526 A1    Jul. 5, 2012

(51) Int. Cl.
*G06F 17/30*    (2006.01)

(52) U.S. Cl.
USPC .......................................... 707/737; 707/758

(58) Field of Classification Search
None
See application file for complete search history.

(56) References Cited

U.S. PATENT DOCUMENTS

| | | | |
|---|---|---|---|
| 7,360,174 B2 | 4/2008 | Grossman et al. | |
| 7,370,290 B2 | 5/2008 | Grossman et al. | |
| 7,620,404 B2 | 11/2009 | Chasnais et al. | |
| 7,797,642 B1 | 9/2010 | Karam et al. | |
| 2004/0153335 A1* | 8/2004 | O'Keeffe | 705/1 |
| 2004/0199581 A1 | 10/2004 | Kucharewski et al. | |
| 2006/0190600 A1* | 8/2006 | Blohm et al. | 709/225 |
| 2007/0027700 A1* | 2/2007 | Ahamparam et al. | 705/1 |
| 2008/0091682 A1* | 4/2008 | Lim | 707/9 |
| 2008/0276197 A1 | 11/2008 | Diederiks et al. | |
| 2009/0043843 A1* | 2/2009 | Milewski et al. | 709/204 |
| 2010/0131502 A1 | 5/2010 | Fordham | |
| 2010/0153886 A1 | 6/2010 | Hautala | |
| 2010/0241638 A1 | 9/2010 | O'Sullivan et al. | |
| 2010/0251177 A1 | 9/2010 | Geppert et al. | |
| 2011/0106889 A1* | 5/2011 | Scott et al. | 709/206 |
| 2011/0130168 A1* | 6/2011 | Vendrow et al. | 455/556.1 |
| 2011/0219081 A1* | 9/2011 | Parthasarathy et al. | 709/206 |

* cited by examiner

*Primary Examiner* — Son T Hoang
(74) *Attorney, Agent, or Firm* — Patents on Demand P.A.; Brian K. Buchheit; Scott M. Garrett

(57) ABSTRACT

An ungrouped list associated with a communication artifact can be identified. The information can be associated with a recipient, which can be a user registered within a computing system. Group data information associated with an external source can be received. The source can be a data source not associated with the artifact. The group data can include a group and/or a contact identifier. Recipient information from the recipient list can be associated with a group identifier if the recipient identifier is equivalent to the contact identifier within the group data. A grouped list can be generated from the associated data. A grouped list can be presented within an interface. The presenting can present recipient information within a logical grouping for at least a portion of the recipients of the ungrouped list. The grouping can be an organization of recipient information associated with the group identifier.

21 Claims, 3 Drawing Sheets

Interface 205

Title: The Scoop

Grouping: [Social Network ▽] ─230

Email Header 210

To: ⊟ [Group A] ⊠ ─214
    212

[Recip_A] [Recip_B] [Recip_D]
  220      222      224

⊟ Group B
      228
   ■ Recip_C    ▨ Recip_E    Recip_F    ─226

⊞ Group C

Scenario 240

Group Data 246

| Contact_ID | Group_ID | Label |
|---|---|---|
| Contact_A | GID_A | Group_A |
| Contact_B | GID_A | Group_A |
| Contact_C | GID_B | Group_B |

SELECTIVELY ORGANIZING A RECIPIENT LIST BASED ON EXTERNAL GROUP DATA

BACKGROUND

The present invention relates to the field of data transformation.

Within an enterprise, a communication such an electronic meeting invite can be conveyed to many recipients within the enterprise. The electronic meeting invite can include a recipient list (e.g., contact list) within the header of the invite. The header typically includes many fields such as a "To", "From", "CC" field which denotes recipients and/or attendees. Often times, the fields can present recipient information such as recipient names, recipient email address, and occasionally presence information.

BRIEF SUMMARY

One aspect of the disclosure can include a method, a computer program product, a system, and an apparatus for selectively organizing a recipient list based on external group data. An ungrouped list associated with a communication artifact can be identified. The list can contain contact information including a recipient name and an identifier. The information can be associated with a contact, which can be a user registered within a computing system. A group data associated with an external source can be received. The source can be a data source not directly associated with the artifact. The group data can be represented by a group and a contact identifier. Contact information from the recipient list can be associated with a group identifier in a situation where the recipient identifier is equivalent to the contact identifier within the group data. A grouped list can be generated from the associated data. A grouped list can be presented within an interface. The presenting (in a graphical user interface (GUI) embodiment) can visually display contact information within a logical grouping. In the case of a voice user interface (VUI), the group list can audibly present the contact information. In one embodiment, recipient information for one or more of the groupings can be hidden. For example and in one specific situation, recipient information and/or grouping information related to a person in a user's contact list can be selectively hidden based on an assumption (or configured setting) that a user is most concerned with recipients outside his/her contact list. In one embodiment, the grouping can be an organization of the contact information associated with the group identifier.

Another aspect of the present disclosure can include a system, a method, a computer program product, and an apparatus for selectively organizing a recipient list based on external group data. A grouping engine can be able to transform an ungrouped list associated with a communication artifact into a grouped list. The ungrouped and grouped list can include contact information. The contact information can be a recipient name and a recipient identifier. Each contact within the ungrouped list can be associated with a group when the contact is present within the group data. A data store can be configured to persist a group data associated with an external source. The external source can be a data source indirectly associated with the communication artifact. The group data can be a group identifier and a contact identifier.

DETAILED DESCRIPTION

Figure 1:
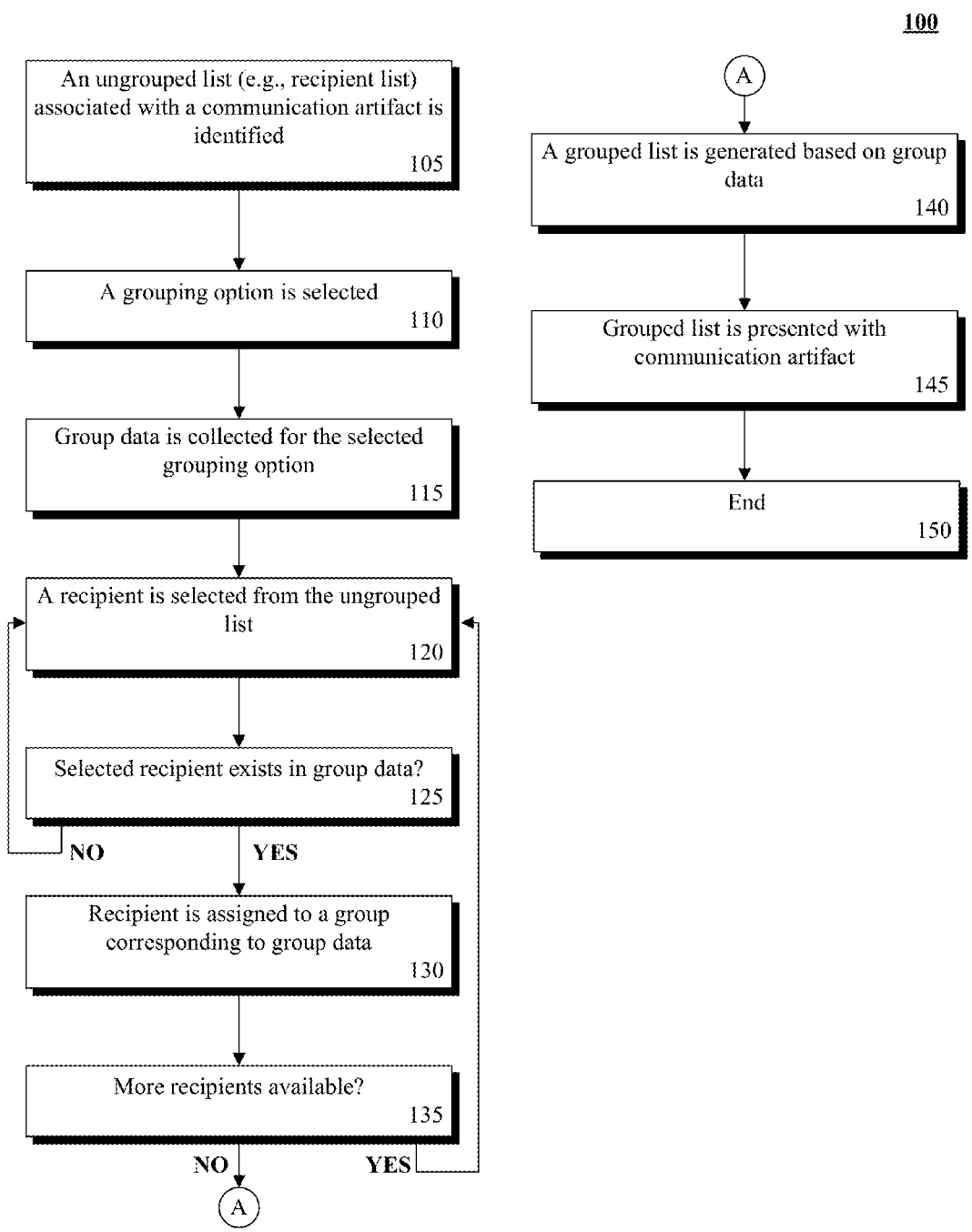
FIG. 1 is a flowchart diagram illustrating a method for selectively organizing a recipient list based one external group data in accordance with an embodiment of the inventive arrangements disclosed herein.

In many instances, header information of messages can become crowded with recipient information, which can develop into a confusing and overwhelming obstacle for a user to examine. As a result, it can often be difficult and time consuming for recipients of a meeting invitation (or other such message) to identify important attendees (e.g., via recipient list) associated with the meeting. Currently, important recipients can be determined by manually analyzing the recipient list of the invite. Often times, the recipient list is not organized in a familiar fashion and consequently, important attendees can be overlooked. That is, the manual process of examining meeting invites can be a time consuming and error prone process.

The present disclosure is a solution for selectively organizing a recipient list based on external group data. External group data can refer to data maintained in a data store external to a message (containing header information). External group data can also refer to data maintained by a system external to a message processing/handling system (e.g., a meeting server, an email server, an Instant Messaging (IM) server, another communication server, etc.). In the solution, a recipient list associated with a communication artifact can be identified. The communication artifact can be, but is not limited to, an email, a meeting invite, a calendar event, a text exchange, and the like. The recipient list can be organized utilizing external group data. External group data can include data retrieved from a communication application (e.g., text exchange application), directory service, address book application, and the like. Groupings obtained from group data can be utilized to organize the recipient list. In one instance, contact information within an email header can be organized with group data obtained from a text exchange application. For example, an address book can be organized using group data obtained from an IBM LOTUS SAMETIME contact list, permitting familiar presentation of contact information within the address book.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart diagram illustrating a method 100 for selectively organizing a recipient list based on external group data in accordance with an embodiment of the inventive arrangements disclosed herein. In method 100, a recipient list associated with a communication artifact can be organized utilizing familiar groupings. Group data from an external application can be collected and analyzed to determine logical groupings for the recipient list. For instance, an email recipient list can be organized into groups associated with a buddy list of an instant message application.

In step 105, an ungrouped list associated with a communication artifact can be identified. The ungrouped list can include recipient information associated with the artifact. Recipient information can be associated with a recipient which can include, but is not limited to, an email address, a username, a unique identifier, a screen name, and the like. For example, the recipient information can be an email address of a user. A recipient can be a user registered within a computing system associated with method 100. The communication artifact can include, but is not limited to, a calendar event, a distribution list, an email, a meeting invite, a text exchange, and the like.

In step 110, a grouping option can be selected. Selection can be automatically and/or manually established. In one instance, a user can select a grouping option from a set of available grouping options. In the instance, an interface can present a user with grouping options permitting customizable organization of a recipient list. In step 115, group data can be collected for the selected grouping option. Group data can be automatically obtained from one or more sources, including, but not limited to, an application, a service, a Web-based service, an Application Programming Interface (API), and the like. Group data can include contact information and an associated grouping. Contact information can be associated with a contact entry corresponding to a user registered within a computing system. Contact information can include, but is not limited to, name, email address, mailing address, home address, phone number, notes, and the like. In step 120, a recipient can be selected from the ungrouped list.

In step 125, if a selected recipient exists within the group data, the method can continue to step 130, else return to step 120. That is, a recipient can be matched against a contact within the group data to determine when the recipient belongs to a group within the group data. Step 125 can be completed in any traditional and/or proprietary manner. In step 130, the selected recipient can be assigned to a group corresponding to group data. In step 135, if more recipients are available within the ungrouped list, the method can return to step 120, else continue to step 140. In step 140, a grouped list can be generated based on group data. In one instance, the grouped list can replace the ungrouped list within the communication artifact. In step 145, the grouped list can be presented with the communication artifact. In one instance, the grouped list can be visually distinct indicating one or more groups of recipients. Grouped lists can also be audibly presented in a voice user interface (VUI). In one embodiment, the groups can be filtered to hide a portion of the recipient information, which from configurable settings are believed to be unimportant to a recipient. In one embodiment, the groups can be presented within a user interface as a set of expandable nodes, which can hide group specific information when a group node is collapsed (e.g., see Group C of interface 205). Further, any number of information suppression/organization techniques can be optionally implemented. For example, in one embodiment, a flyover window can be activated showing recipients in a group, where activation occurs responsive to a GUI pointer hovering over a group name for a predetermined duration. In step 150, the method can end.

Drawings presented herein are for illustrative purposes only and should not be construed to limit the invention in any regard. Steps 120-135 can be iteratively repeated for each recipient within the ungrouped list. In one instance, method 100 can be performed for each communication artifact within a communication server. In the instance, a user profile can configure method 100 to be executed selectively for each communication artifact associated with the user. For example, when a communication artifact is received by the communication server, method 100 can be automatically executed upon the artifact. It should be appreciated that grouped list can include, subgroups which can be arbitrarily limited and/or unlimited.

Figure 2:
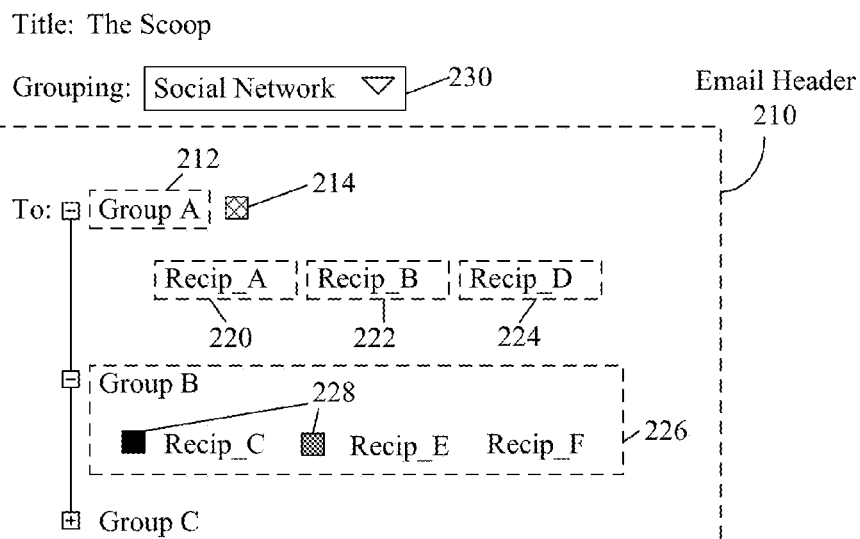
FIG. 2 is a schematic diagram illustrating an interface and a scenario a for selectively organizing a recipient list based one external group data in accordance with an embodiment of the inventive arrangements disclosed herein.
Figure 2:
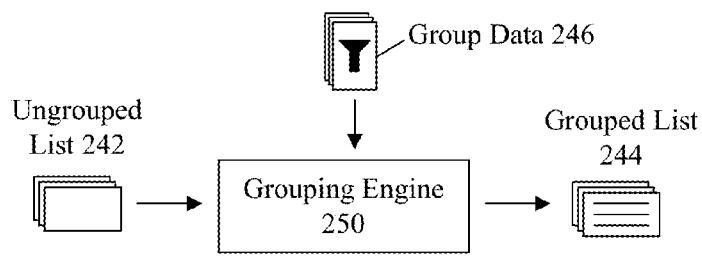

FIG. 2 is a schematic diagram illustrating an interface 205 and a scenario 240 for selectively organizing a recipient list based on external group data in accordance with an embodiment of the inventive arrangements disclosed herein. Interface 205 and scenario 240 can be associated with method 100. In interface 210, external group data can be utilized to format and/or organize the email header 210 information (e.g., recipient list). In one embodiment, other metadata location or memory structure (than the email header 210) can be used for storing group specific data and storage within an email header is not to be considered as a limitation of the disclosure. Email header 210 can be one or more information fields including, but is not limited to, "To", "From", "CC", "BCC", and the like. In scenario 240, group data 246 can act as a filter for an ungrouped list (e.g., recipient list), permitting customized organization of ungrouped list 242. In the scenario, grouping engine 250 can receive group data 246 and process ungrouped list to generate grouped list 244.

In interface 205, a "To" field including recipient information 220-224 can be presented utilizing a user selectable grouping scheme. It should be appreciated that traditional email header 210 fields can be selectively omitted for clarity. Embodiments for organizing traditional and/or proprietary fields containing recipient information can be contemplated. Interface 205 can be a component of an email application, text exchange application, and the like. Interface 205 can include traditional and/or proprietary interface elements. Interface elements can include, but is not limited to, checkboxes, radio dialog, input boxes, and the like. Functionality presented within interface 205 can be available via one or more mechanisms including, a context menu, a file menu, and the like.

In email header 210 (or other group information storing memory/structure), recipient information 220-224 can be organized into a group 212 utilizing interface artifact 230. Artifact 230 can permit user selection of groupings which can be available. For example, header 210 can be organized into familiar social networking contact groups through selection of a "social network" entry within artifact 230. It should be appreciated that multiple social networking sources can be supported permitting selection of preferred social networking relationship groupings. In one instance, artifact 230 can be a drop-down selection box for manipulating grouping of recipient list information associated with email header 210. In one embodiment, email header 210 can be organized in real-time in response to a user interaction with artifact 230. In the embodiment, selection of an entry within artifact 230 can dynamically alter grouping of recipient list information.

In one embodiment, recipient information associated with email header 210 (or other metadata section of a message or other memory location containing the grouping and recipient information) can be organized in a visually distinct manner. In the embodiment, recipient information 220-224 can be formatted into a collapsible tree structure. In the embodiment, recipient information 220-224 can be selectively hidden and/or presented based on user interaction with interface elements. Groupings can be organized utilizing one or more group data sources including, but not limited to, address book groups, social network groups, distribution list groups, text exchange groups, and the like.

Grouping element 212 can be an interface element indicating a group associated with recipient information 220-224. Grouping element 212 can include, but is not limited to, a name, a group identifier, a group value, a user defined value, and the like. In one instance, grouping element 212 can be associated with a graphical element 214. In the instance, element 214 can be a graphical icon representing a grouping. For example, icon 214 can be a familiar system icon permitting rapid determination of a group type.

Recipient information 220-224 can be presented in one or more user customizable fashions, including, but not limited to, traditional and/or non-traditional organizations. In one instance, recipient information 220-224 can be organized in alphabetical order. In another instance, recipient information 220-224 can be organized in order based on relationship information associated with the recipient. For instance, social network group data can be used to organize recipient information 220-224. In one embodiment, the recipient information 220-224 can be expanded upon to show a variety of recipient specific values, such as name, address, phone number, organization, position, presence information, and the like. For example, in one embodiment, a flyover window with additional information can be dynamically presented responsive to a GUI pointer hovering over the recipient identifier (220-224) for a previously established duration.

Grouping 226 can be an interface element indicating a group associated with recipient information. In one embodiment, grouping 226 can include graphical element 228 associated with a recipient information (e.g., recipient email address). In the embodiment, graphical element 228 can be used to indicate presence information. For instance, the disclosure can support traditional presence (e.g., online, away) notifications.

It should be appreciated that the grouping information, layout, and elements of the interface 205 are not intended to be comprehensive and that other specific arrangements are contemplated. For example, in one embodiment, an inverse grouping (e.g., element 230) can exist so that a set of recipients no in a user designated group (or set of groups) can be shown. For example, all recipients not in a person's contact list can be shown, which would be an example of an inverse group. Further, group based inclusion/exclusion filters (e.g., white and black lists) can be configured in one embodiment.

In scenario 240, group data 246 can be received as input to a grouping engine 250. Group data 246 can be obtained from one or more sources including, but not limited to, historic grouping information, manually established grouping information, and the like. It should be appreciated that group data 246 is presented as an exemplary data set and should not be construed to limit the invention in any regard.

In one instance, scenario 240 associated with a portion of a collaboration software. In the instance, the collaboration software can be a portion of an electronic meeting system, Web conferencing software, and the like. In one embodiment, engine 250 can produce multiple variants of grouped list 244 from an ungrouped list 244.

In one embodiment, group data 246 can be persisted within engine 250 permitting rapid re-organization of grouped list 244. In the embodiment, group data 246 can be persisted within a data store associated with engine 250.

Drawings presented herein are for illustrative purposes only and should not be construed to limit the invention in any regard. In one instance, an email header 210 and a corresponding message body can be organized using group data. In one embodiment, grouping engine 250 can iteratively process grouped list 244 to enable multiple organizational schemes to be applied to the grouped list 244. It should be appreciated that each grouping can be customizable permitting unique visual presentations to be achieved. It should be noted that interface artifact 230 can be customized through automatic and/or manual procedures. Interface 205 can be a graphical user interface (GUI), voice user interface (VUI), mixed-mode interface, text-based interface, and the like.

Figure 3:
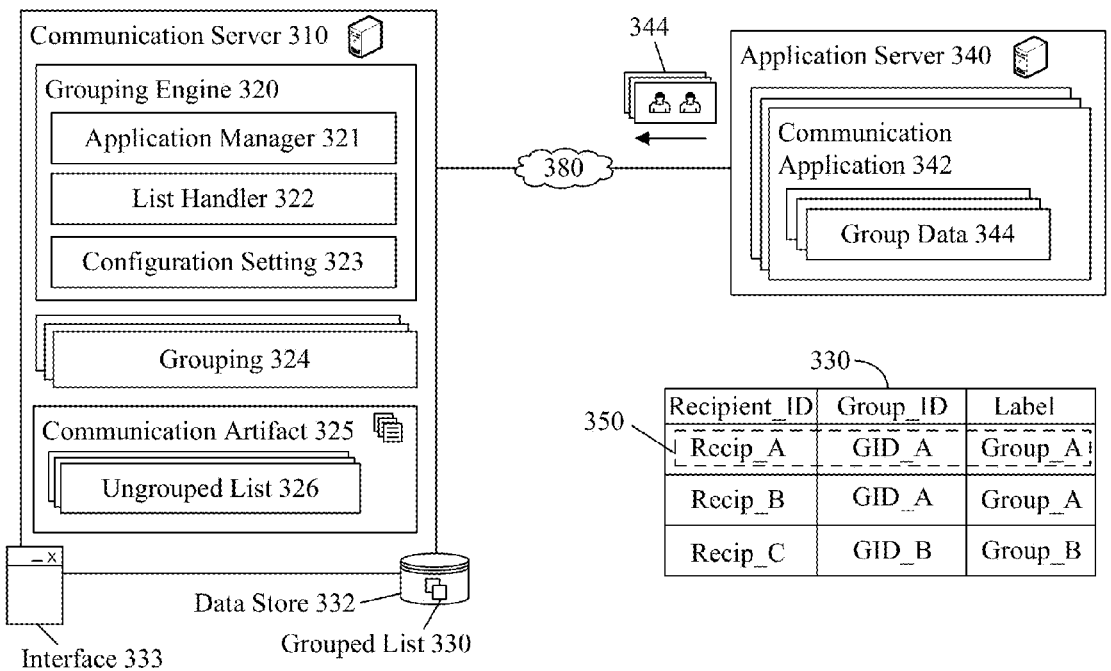
FIG. 3 is a schematic diagram illustrating a system for selectively organizing a recipient list based one external group data in accordance with an embodiment of the inventive arrangements disclosed herein.

FIG. 3 is a schematic diagram illustrating a system 300 for selectively organizing a recipient list based on external group data in accordance with an embodiment of the inventive arrangements disclosed herein. System 300 can be present in the context of method 100, interface 205, and/or scenario 240. In system 300, group data 344 obtained from a communication application 342 can be utilized to organize an ungrouped list 326 into a grouped list 330. Communication sever 310 can be communicatively linked to application server 340 via network 380. Group data 344 can be communicated to server 310 by server 340. In one instance, group data 344 can be persisted internally within communication server 310. In the instance, group data 324 can be transformed into a standardized format and stored for rapid access. That is, group data 344 can be locally cached within server 310.

Communication server 310 can be a hardware/software entity for conveying communication artifact 327 to one or more destinations. Communication server can include, but is not limited to, grouping engine 320, grouping 324, communication artifact 325, interface 333, data store 332, and the like. Communication server 310 can be a component of calendaring system, mail server (e.g., mail transfer agent), conferencing server, and the like. Server 310 can be communicatively linked to one or more clients (not shown). In one embodiment server 310 can be a component of an IBM LOTUS DOMINO server.

Grouping engine 320 can be a hardware/software entity for selectively organizing a recipient list utilizing external group data 344. Grouping engine 320 can include, but is not limited to, application manager 321, list handler 322, configuration setting 323, and the like. In one instance, engine 320 can be a network element within a networked computing environment. In another instance, engine 320 functionality can be encapsulated as a Web-enabled service. In the instance, engine 320 can be utilized by any application 342 existing within system 300, permitting application extensibility. That is, engine 320 can permit an existing application to gain customizable recipient list organizational schemes without requiring modification to the application.

Application manager 321 can be a hardware/software element for registering external data sources for obtaining group data 344. In one instance, application manager 321 can automatically detect relevant sources to obtain group data 344. In the instance, manager 321 can utilized a registry of data sources to determine group data 344 source. In another instance, manager 321 can be manually configured to select data sources for group data 344. In the instance, configuration setting 323 can permit manual selection of group data 344 source.

List handler 322 can be a hardware/software entity for managing ungrouped list 326 and/or grouped list 330. In one instance, list handler 322 can be a high order function algorithm permitting organization of list 326, 330. In the instance, list handler 322 can be a filter which can be dynamically applied to list 326, 330. The algorithm can be a portion a computer program associated with a computing programming language. Computer programming language can include, but is not limited to, C, C++, Practical Extraction and Reporting Language (PERL), Python, and the like. In one instance, list handler 322 can compare list 326 to group data 344 to determine relevant groupings for list 326. For instance, handler 322 can utilize an injective function to determine when a recipient from list 326 exists within a group data 344, Configuration setting 323 can be one or more options for establishing the behavior of system 310 and/or engine 320. Setting 323 can include, but is not limited to, grouping options, application manager settings, list handler settings, caching options, and the like. Setting 323 can be configured through one or more user interfaces including, but not limited to, a user interface 333, a client user interface, and the like. Setting 323 can be automatically and/or manually established. In one instance, setting 323 can be heuristically determined. In one instance, configuration setting 323 can permit prioritization of data sources of group data 344. In the instance, prioritization can be determined automatically and/or manually based on historic settings, application settings, and the like.

Grouped list 330 can be one or more data sets permitting recipient information to be associated with a group. For example, in entry 350, a Recip_A can be associated with a group Group_A. Grouped list 330 can include, but is not limited to, recipient identifier, group identifier, group label, and the like. Grouped list 330 can be a dynamically created for each communication artifact 325. Grouped list 330 can be responsively updated when changes within application 342 and/or group data 344 occur. It should be appreciated that grouped list 330 can permit a one-to-one mapping, a one-to-many mapping, a many-to-one mapping, and the like. For instance, when a contact belongs to multiple groups within an application, grouped list 330 can be utilized to persist the relationship.

Communication artifact 325 can be a digitally encoded entity associated with a recipient list (e.g., ungrouped list 326). Artifact 325 encoding can include, but is not limited to, binary, text, and the like. It should be appreciated that artifact 325 can be stored within server 310, within a data store (e.g., data store 332), and the like. In one embodiment, artifact 325 can include multiple ungrouped lists 326. In one instance, artifact 325 can be associated with a payload (e.g., message body) which can include a contact list. In the instance, the contact list within the payload can be arranged in a similar fashion utilizing engine 320. In one embodiment, communication artifact 325 can be a software element within an application. In the embodiment, a contact list within a text document associated with a word processor program can be organized utilizing group data 344.

Ungrouped list 326 can be a data set of recipient information associated with a communication artifact 325. Ungrouped list 326 can be an ordered list, unordered list, and the like. List 326 can be a computing data structure conforming to an array, an associative array, a list, a linked list, and the like.

Grouped list 330 can be a data set of recipient information associated with a communication artifact 325 and a group data 344. Grouped list 326 can include, but is not limited to, groups, sub-groups, and the like. List 330 can be a computing data structure conforming to an array, an associative array, a list, a linked list, and the like.

Data store 332 can be a computer readable medium for persisting grouped list 330. Data store 332 can be a networked attached storage (NAS), Storage Area Network (SAN), and the like. Data store 332 can be a component of a Relational Database Management System (RDMS), Object Oriented Database Management System (OODBMS), and the like.

Application server 340 can be a hardware/software entity for executing communication application 342. Server 340 can include, but is not limited to, a communication application 340, a data store (not shown), and the like. In one instance server 340 can be an IBM WEBSPHERE APPLICATION SERVER.

Communication application 342 can be a software program able to store group data 344 associated with contact information. Application 342 can include, but is not limited to, email application, calendaring application, text exchange software, social networking application, and the like. Application 342 can include, but is not limited to, a desktop application, mobile application, Web-based application, and the like.

Group data 344 can be a data set comprising of a grouping information and a contact information associated with an application 342. Grouping information can include, but is not limited to, a group identifier, a group label, a group permission, an image, a multimedia data, and the like. Group data 344 can include one or more traditional and/or proprietary formats stored within application 342.

It should be understood that system 300 can be associated with a Service Oriented Architecture. It should be appreciated that system 300 can include, but is not limited to, a distributed computing environment, networked computing environment, cloud computing environment, and the like. Data structures associated with system 300 can include, but is not limited to, Hypertext Markup Language (HTML), Extensible Markup Language (XML), and the like. It should be appreciated that data within system 300 can be protected through one or more traditional and/or proprietary mechanisms. Mechanisms can include, but is not limited to, encryption, authentication, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method utilizing a computer processor to implement steps comprising:
   identifying an ungrouped recipient list associated with a communication artifact for a user, wherein the ungrouped recipient list is comprised of recipient information associated with at least one recipient;
   receiving group data from an external source, wherein the external source is a data source not associated with the communication artifact, wherein the received group data comprises information of contacts associated with the user and associated grouping information of the contacts;
   mapping the recipient information for at least a portion of the recipients of the ungrouped recipient list to the received group data;
   associating the mapped recipient information to a particular group contained in the group data based on the mapping;
   generating a grouped recipient list based on the associating; and
   presenting the ungrouped and grouped recipient lists simultaneously within an interface of the communication artifact to the user.

2. The method of claim 1, wherein the data source is a communication application.

3. The method of claim 2, wherein the communication application is at least one of a calendaring application, a social networking application, a text exchange application, and an address book application.

4. The method of claim 2, wherein the communication application is at least one of an IBM LOTUS SAMETIME application and an IBM LOTUS NOTES application.

5. The method of claim 1, wherein the communication artifact is an email, a meeting invite, a calendar event, distribution list, and a text exchange.

6. The method of claim 1, wherein the group data is manually selected by the user.

7. The method of claim 1, wherein the grouped recipient list is user customizable upon presentation.

8. The method of claim 1, further comprising presenting visually distinct recipient information within a logical grouping for all of the recipients of the ungrouped recipient list.

9. The method of claim 1, wherein the at least a portion of the recipients of the ungrouped recipient list is associated with a logical grouping, wherein the logical grouping is an inverse grouping of recipients that are not listed in a contact list of a user.

10. A system comprising:
    a computer processor;
    a computer memory, in communication with the computer processor, having program codes related to:
       a grouping engine for:
          transforming an ungrouped recipient list for a communication artifact associated with a user into a grouped recipient list,
       wherein the ungrouped and grouped recipient lists comprises of recipient information, wherein each recipient within the ungrouped recipient list is associated with a group if the recipient is present within group data; and
       presenting the ungrouped and grouped recipient lists simultaneously within an interface of the communication artifact to the user; and a data store for persisting the group data from an external source, wherein the external source is a data source not associated with the communication artifact, wherein the group data comprises information of contacts associated with the user and associated grouping information of the contacts.

11. The system of claim 10, wherein the grouped recipient list is persisted within the data store.

12. The system of claim 10, wherein the data store is associated with a directory server.

13. The system of claim 10, wherein the grouping engine is an IBM WEBSPHERE server.

14. The system of claim 10, wherein the the external source is at least one of an IBM LOTUS SAMETIME application and an IBM LOTUS NOTES application.

15. The system of claim 10, wherein the communication artifact is an email, a meeting invite, a calendar event, distribution list, and a text exchange.

16. The system of claim 10, further comprising:
an application manager able to export the group data associated with a communication from the external source;
a list handler configured to identify a recipient within the ungrouped recipient list and determine an equivalent contact within the exported group data.

17. A computer program product comprising a non-transitory computer readable storage medium having computer usable program code which when executed by a computer causes the computer to:
identify an ungrouped recipient list associated with a communication artifact for a user, wherein the ungrouped recipient list is comprised of recipient information associated with at least one recipient;
receive group data from an external source, wherein the external source is a data source not associated with the communication artifact, wherein the received group data comprises information of contacts associated with the user and associated grouping information of the contacts;
map the recipient information for at least a portion of the recipients of the ungrouped recipient list to the received group data;
associate the mapped recipient information to a particular group contained in the group data based on the mapping;
generate a grouped recipient list based on the associating; and
present the ungrouped and grouped recipient lists simultaneously within an interface of the communication artifact to the user.

18. The computer program product of claim 17, wherein the communication artifact is an email, a meeting invite, a calendar event, distribution list, and a text exchange.

19. The computer program product of claim 17, wherein the external data source is associated with a directory service.

20. The method of claim 1, wherein the recipient information comprises a recipient name, a recipient identifier, or a recipient name and a recipient identifier associated with the at least one recipient.

21. The method of claim 1, wherein generating the grouped recipient list comprises grouping the recipient information within a logical grouping for at least the portion of the recipients of the ungrouped list, wherein the grouping is an organization of the recipient information associated with the group identifier.

* * * * *